Figures 1, 2:
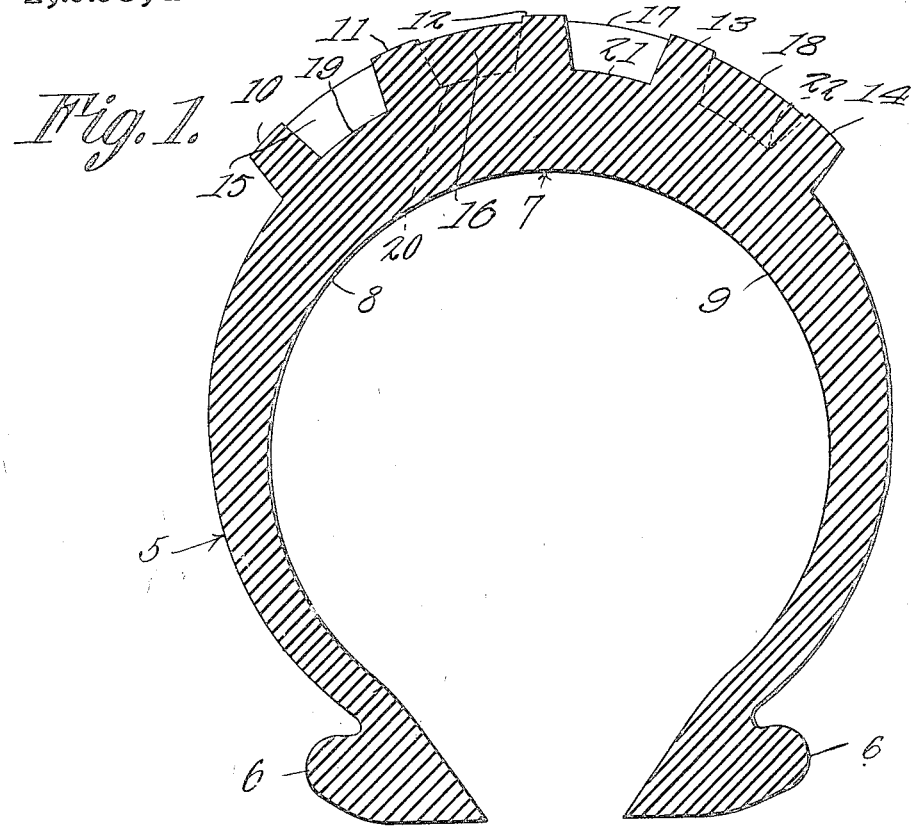

A. S. MAUK.
WHEEL TIRE.
APPLICATION FILED DEC. 3, 1914.

1,225,459.

Patented May 8, 1917.

Inventor
Albert S. Mauk,
By Henry J. Brewington.
Attorney

Witnesses
F. B. Wooden.
E. Walton Brewington.

UNITED STATES PATENT OFFICE.

ALBERT S. MAUK, OF ORANGEVILLE, MARYLAND.

WHEEL-TIRE.

1,225,459. Specification of Letters Patent. Patented May 8, 1917.

Application filed December 3, 1914. Serial No. 875,235.

*To all whom it may concern:*

Be it known that I, ALBERT S. MAUK, a citizen of the United States, residing at Orangeville, in the county of Baltimore and State of Maryland, have invented certain new and useful Improvements in Wheel-Tires, of which the following is a specification.

This invention relates to tires for vehicle wheels and especially to that class known as non-skid tires for the wheels of automobiles and like vehicles.

The primary object of the invention is to provide a tire of the character specified which, while of a very simple form and economical construction, will be reliable and lasting for its intended purpose.

A specific object of the invention is to provide a tire of the character specified which, at all times, will present upon slippery pavements a series of vacuum cups or spaces to always prevent slipping or skidding on such surfaces.

With these objects in view, the invention consists in the improved construction, arrangement and combination of the parts of a non-skid tire which will be hereinafter fully described and afterward specifically claimed.

In order that the construction and operation thereof may be readily comprehended, I have illustrated in the accompanying drawings, an approved embodiment of my invention, and will now proceed to specifically describe the same in connection with said drawings, in which—

Figure 1 represents a sectional view of a tire constructed in accordance with my invention, taken on the plane indicated by the broken line 1—1, of Fig. 2, and Fig. 2 represents an outside view of a portion of my tire, looking at the same from a point above Fig. 1, being a view of a portion of the tread of the tire.

Whenever the same parts appear in both figures, they are indicated by the same reference characters.

Referring specifically to the drawings, 5 indicates a rubber tire of ordinary construction except as hereinafter specified, the same being shaped at the edges 6, 6 in any suitable or preferred form to facilitate attachment to the rim of the wheel, and provided with the usual thickened tread portion 7 extending around the tire and transversely from substantially the point 8 to the point 9, as indicated in Fig. 1.

Formed upon and projecting from the tread 7 is a series of circumferential ribs 10, 11, 12, 13, and 14, five being shown in this instance, although the number may be varied, as may be desired. These ribs are preferably tapered transversely and outwardly, being thicker at their bases than at their outer edges, leaving circumferential, somewhat flaring grooves between adjacent ribs.

Transversely in such grooves are formed cross bars as at 15, 16, 17 and 18, such cross bars being also preferably tapered outwardly, being thicker at their bases than at their outer edges, and they are also preferably of a less radial depth than the circumferential ribs, as clearly shown.

The cross bars 15 are located between ribs 10 and 11, the cross bars 16 between ribs 11 and 12, the cross bars 17 between ribs 12 and 13, and the cross bars 18 between ribs 13 and 14, and there are, consequently, four series of outwardly flaring cups, as at 19, 20, 21 and 22 formed on the outside of the tread proper 7, each series extending around the tire and separated by the ribs and disposed in overlapping relation to the series in the adjacent row while the cups of each series are separated by the cross bars.

Ordinarily, a popping, explosive-like sound would occur as the exhausted cups would raise from the surface to which they adhere, but the construction of the cross-bars which terminate below the outer edges of the circumferential ribs affords a vent for the cups before they are entirely raised off the surface over which they may be passing, thus obviating this difficulty by preventing such disagreeable popping, and the extended ribs also protect the cross bars from the necessity of bearing the full weight of the vehicle.

The cross bars are arranged in staggered relation to those of the adjacent series for the purpose of having, at all times, entire cups under the wheels, the releasing of the vacuum in the cups of adjacent series being also so regulated that it will not be simultaneous, thereby affording uniformity and continuity in action in both creating and releasing the vacuums.

When the tire is new the greatest strain will be brought upon that part between ribs 11 and 13 but as this part gradually wears, and consequently weakens first, and as this gradual wear and weakening takes place, the parts of the tire between the ribs 10 and 11 and 13 and 14, gradually take off the wear and strain, so that the vacuum, non-skidding effect, will be continued until the tire is entirely worn out.

While I have described the exact construction and relation of the several parts, it will be obvious to those skilled in this art, that slight changes and variations may be made therein, without departing from the spirit and scope of the invention.

Having thus fully described my invention, what I claim as new, and desire to secure by Letters Patent of the United States, is

A non-skid tire having on its tread a central circumferential main rib and at each side of said main rib a plurality of circumferential auxiliary ribs and having a plurality of transverse bars lying in staggered relation between the main and the auxiliary ribs and integrally formed at their ends therewith, the circumferential main and auxiliary ribs and transverse bars providing circumferential rows of cups, all the said circumferential ribs extending beyond the outer faces of the transverse bars to gradually break the sealing of the cups when being relieved from compression, the transverse bars bracing the circumferential ribs and by their staggered relation acting when the tread is compressed to distort the circumferential ribs into sinuous form at the points under compression, said auxiliary circumferential ribs providing lateral abutments for engagement with the road-way when the central rib is compressed to hold the tire from lateral skidding.

In testimony whereof I affix my signature in presence of two witnesses.

ALBERT S. MAUK.

Witnesses:
E. WALTON BREWINGTON,
HOWARD D. ADAMS.